T. G. CUMMINGS.
SHOE DISPLAY RACK FOR TRUNKS.
APPLICATION FILED DEC. 7, 1914.

1,231,713.

Patented July 3, 1917.
3 SHEETS—SHEET 2.

Witnesses
Howard H. Yannington
Mae Rankin

Inventor
Thomas G. Cummings
By Moulton & Livrance
Attorneys.

T. G. CUMMINGS.
SHOE DISPLAY RACK FOR TRUNKS.
APPLICATION FILED DEC. 7, 1914.
1,231,713.
Patented July 3, 1917.
3 SHEETS—SHEET 3.
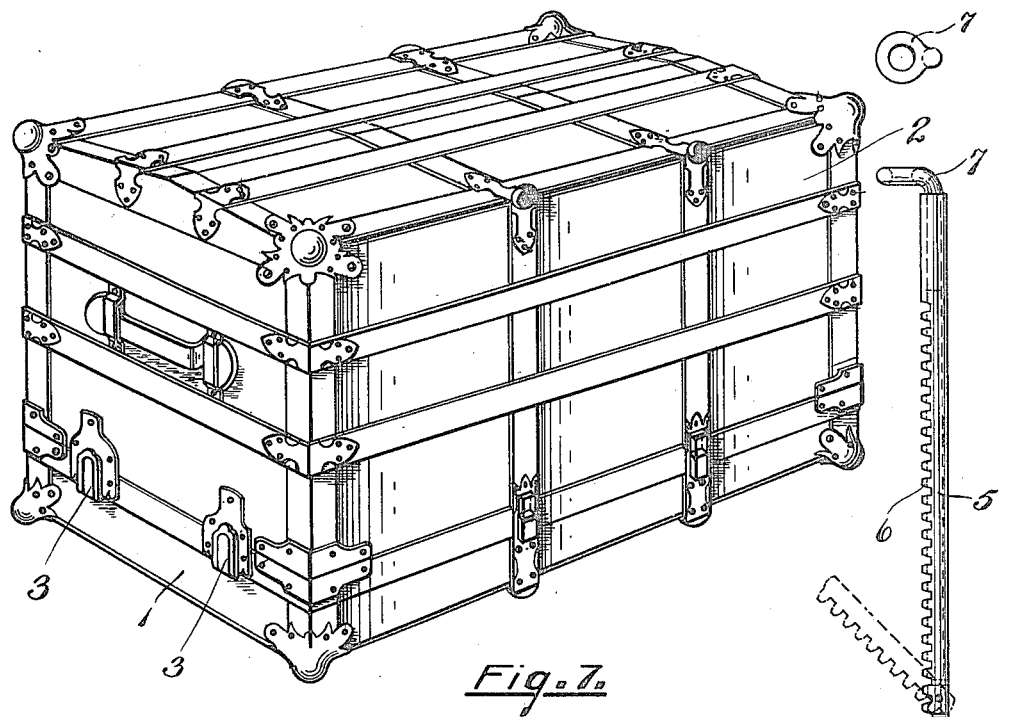
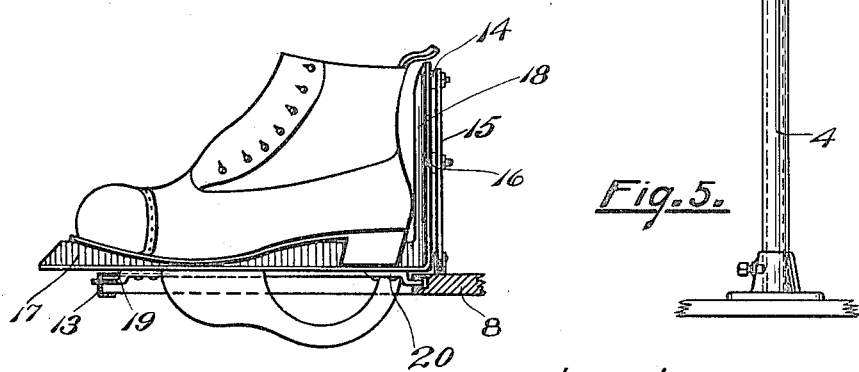
Witnesses
Howard H. Yarrington
Mae Parkin
Inventor
Thomas G. Cummings.
By Moulton & Livrance.
Attorneys.

UNITED STATES PATENT OFFICE.

THOMAS G. CUMMINGS, OF GRAND RAPIDS, MICHIGAN, ASSIGNOR TO GRAND RAPIDS TRUNK COMPANY, OF GRAND RAPIDS, MICHIGAN, A CORPORATION OF MICHIGAN.

SHOE-DISPLAY RACK FOR TRUNKS.

1,231,713.  Specification of Letters Patent.  Patented July 3, 1917.

Application filed December 7, 1914. Serial No. 875,852.

*To all whom it may concern:*

Be it known that I, THOMAS G. CUMMINGS, a citizen of the United States of America, residing at Grand Rapids, in the county of Kent and State of Michigan, have invented certain new and useful Improvements in Shoe-Display Racks for Trunks; and I do hereby declare the following to be a full, clear, and exact description of the invention, such as will enable others skilled in the art to which it appertains to make and use the same.

This invention relates to shoe display racks, used in trunks, and it is the object and purpose of the invention to provide a collapsible rack which may be made to occupy comparatively little space whereby it may be inclosed in an ordinary trunk but which may be extended to operative position when it is desired to examine the articles carried by the rack. It is a further object of this invention to provide a new and improved means for effecting the extension of the rack to operative position and for holding it in said position when extended. And this invention comprises structure designed to accomplish these ends, together with other objects and purposes not specifically enumerated, as will appear on understanding being had of the embodiment of the invention disclosed in the drawings in which, Figure 1 is a perspective view of the rack in its extended operative position.

Fig. 5 is a side view of one of the upright standards forming a part of the rack.

Fig. 6 is the side and partial sectional view of the individual shoe holding elements; and, Fig. 7 is a perspective view of a trunk, the rack being inclosed therein.

Like reference characters refer to like parts throughout the several views of the drawings.

Figure 1:
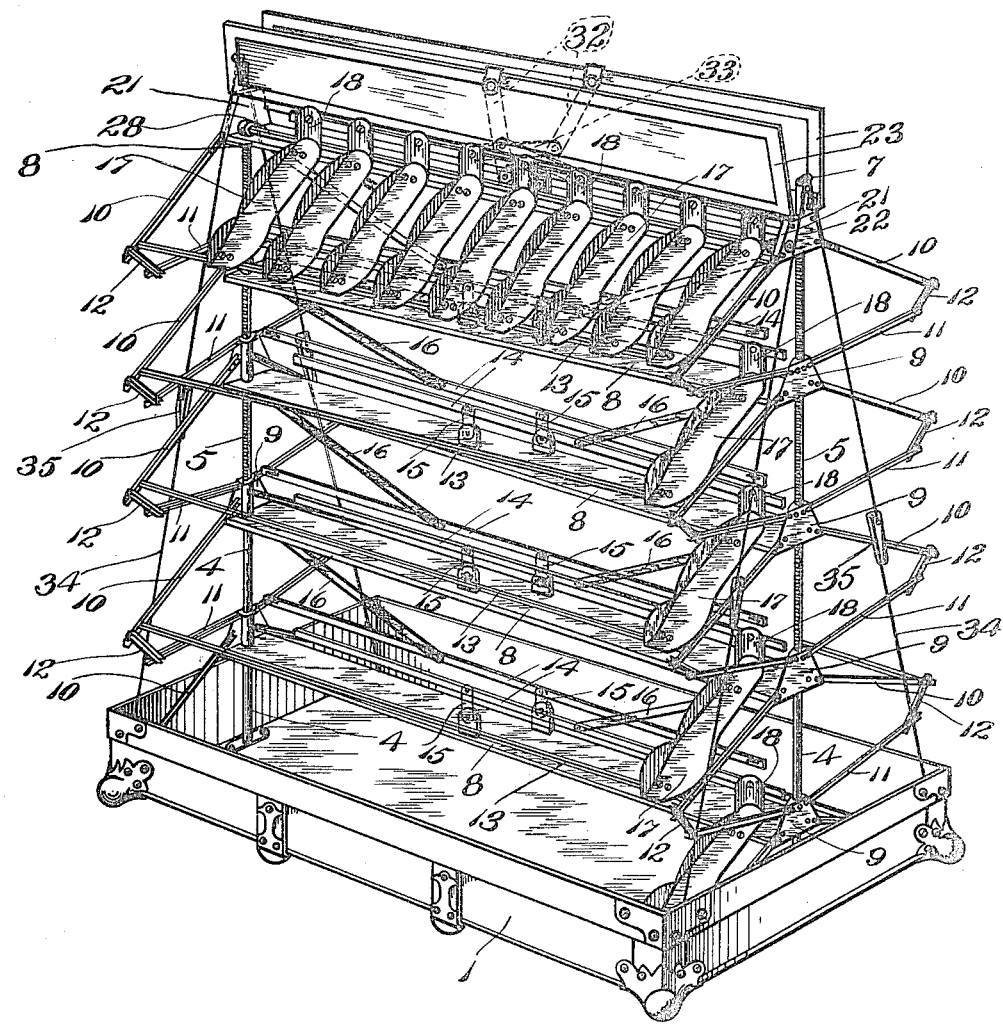

The trunk consists of a base member 1 and an upper member 2 which is adapted to be placed on and removably secured to the base 1 by means of the usual trunk clasps 3 as shown in Fig. 7. The rack for holding shoes is contained within said trunk and may be readily transported with the trunk. In the structure of the rack, there are provided two upright standards 4 fastened securely at each end of the base 1 of the trunk and each having pivotally connected or hinged thereto at its upper end an extension 5, said extension and portions of the upper sections of the post 4 being provided with a rack 6 as indicated in Fig. 5, each extension 5 at its upper end being further provided with a ring 7 permanently secured thereto. Between the posts 4 and extensions 5 thereof, a number of shelves 8 are located, all except the uppermost of said shelves having at each end plates 9 with upper and lower lips turned inwardly and pierced to receive the posts 4 and extensions 5 to permit the slidable movement of the shelves relative to the posts.

The construction except with reference to the uppermost shelf 8 and its attached mechanism is the same in each of the goods holding members, of which, shelves 8 form a part, and a description of one will be sufficient for all of them. Each plate 9 adjacent its connections with the shelves 8 has pivotally connected thereto arms 10 which extend in opposite directions and in the lowermost of said goods holding members, these arms at their ends are connected to the base 1. Each of the plates 9 near its upper end has also pivotally attached thereto oppositely extending arms 11. The arms 10 excepting the lowermost of said arms as previously described, are connected with the arms 11 immediately below by links 12. Each pair of arms 10 extending to one side of the posts 4 is joined together by a cross member 13 of channel iron formation, said cross bar 13 being located near the outer ends of arms 10.

Above each shelf 8 two bars 14 are located lying parallel with the shelf and supported above the shelf by links 15 pivotally connected both to said bars and to the shelf. Bars 14 are spaced a distance apart one lying substantially above each edge of the shelf. Each bar 14 has a link 16 connected thereto which extends upwardly and has pivotal connection at the underside of the shelf 8 next above. The connections of the link 15 to bars 14 is substantially midway between the ends of the bars.

Each goods holding member also includes a number of holders 17 lying between and attached to bars 13 and 14, each holder at its inner end having a vertical section 18 pivotally attached to the bar 14. Said holders on the under sides thereof are provided with pintle members 19 and 20, at the front and back respectively, which pass into openings in bars 13 and the shelves 8 respectively.

It will be apparent that with the construction as thus outlined the goods holding members, each consisting of a shelf 8 and pair of oppositely extending bars 10 and 11, connected together in the manner described, are slidably supported by and between the posts 4 and extensions 5 thereof and are adapted to rest one on the other when said goods holding members are moved to their lowest position. It will also be clear that on elevating the uppermost of said members the connections between said member and the members below serve to elevate the members spacing them apart along the length of the supporting standards; and that when said goods holding members are elevated and spaced apart the links 16 serve to draw the bars 14 to their highest limit above the shelves 8 and rotate the holding members 17 into position such that an article carried by each member is supported upright and in best display position. Also as the goods holding members are collapsed the links 16 actuate the bars 14 lengthwise turning them on their links 15 and also turning the holder 17 about pivots 19 and 20 whereby the articles are automatically turned on their sides as the rack is collapsed so as to occupy the least possible space.

Figure 2:
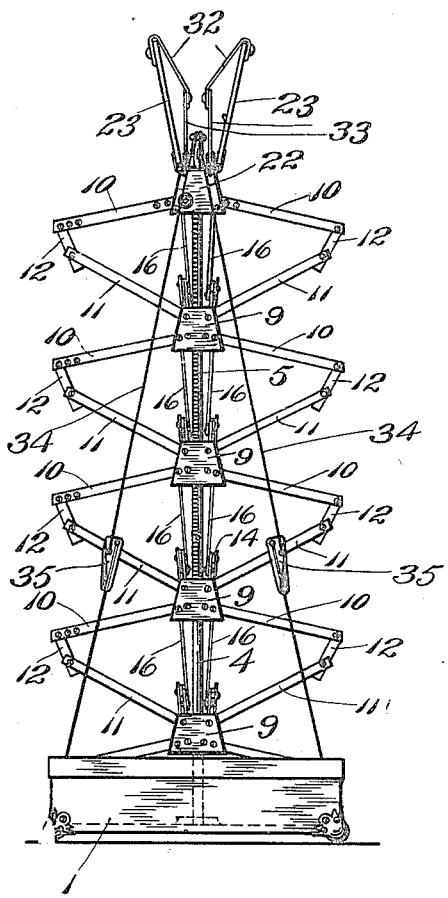
Fig. 2 is an end view thereof.

The uppermost goods holding member is similar in all respects to those below it except that the shelf 8 thereof carries at each end a casing or box 21 in place of the plate 9. Said casing is covered by a cover plate 22 and at each of its upper corners has pivotally connected therewith covers 23 by means of the hinges 24 as shown. A sleeve 25 extends vertically through the casing 21 and slidably receives the extension 5 of the upright standard 4, serving as a guide to cause the casing to move smoothly and evenly on the post and extension thereof. Said sleeve is cut away adjacent its lower end to disclose the rack 6 and permit the engagement of the pinion 26 therewith, the pinion being pivotally mounted in the casing and having a square opening 27 adapted to receive the end of a crank by which it may be rotated. A cross shaft 28 connects the pinions in the two casings mounted on the standards 5 whereby the rotation of one will simultaneously cause the rotation of the other and insure the even and simultaneous elevation of both ends of the uppermost goods holding member. In one of said casings, the one at which the crank is applied to the pinion a dog 29 is pivotally mounted which engages with the pinion, having connected thereto a spring 30 which normally tends to hold the dog in engagement with said pinion. Also a handle 31 is attached to the dog and extends through a side of the casing by which it may be manually operated to be disengaged from the pinion. To each cover 23 a strap 32 is attached by means of which the cover may be raised as shown in Fig. 2, the ends of the straps having detachable engagement with the links 33 which are pivotally connected to the uppermost shelf 8. Guy wires 34 extend upwardly from each corner of the base 1 and are connected with the ring 7 heretofore described, the said guy wires being adjustable as to length by means of the interposed adjusting devices 35.

Figure 3:
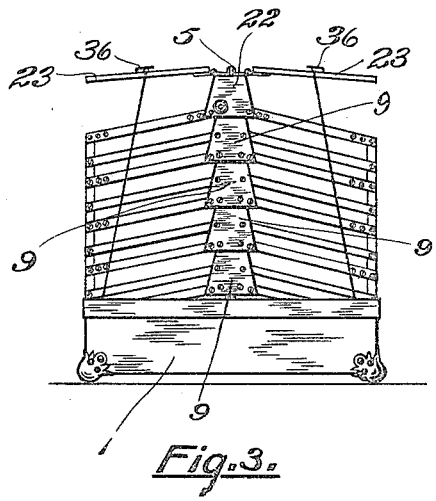
Fig. 3 is an end view of the rack in its collapsed position.
Figure 4:
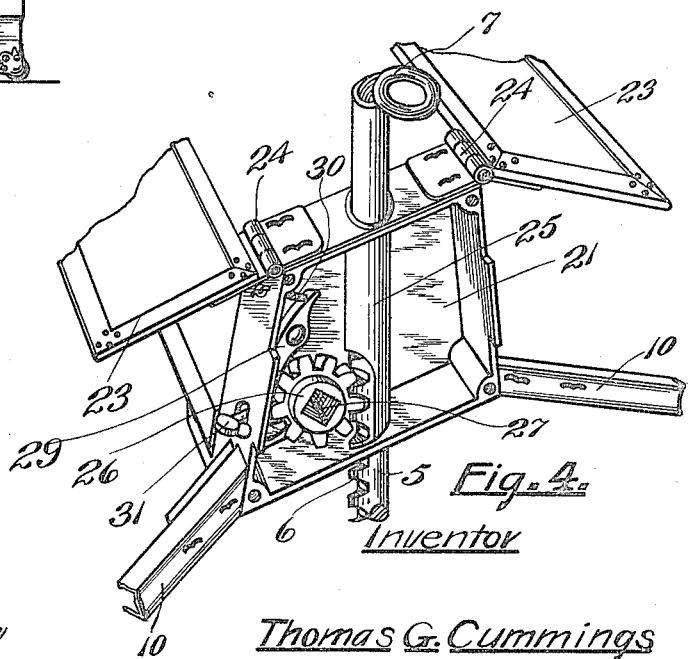
Fig. 4 is a perspective view of the portion of the rack disclosing the means by which the extension of the rack is manually effected.

In the collapsed condition of the rack as shown in Fig. 3 the extensions 5 to posts 4 may be turned inwardly and lie in horizontal position above the goods holding members, the covers 23 may be placed in horizontal position and the guy wires 34 turned over the upper sides of the covers 23 lying adjacent the hooks 36 shown. If it is desired to extend the rack to display the shoes held thereby, the covers are turned upwardly and held in such position as shown in Fig. 2 and the extensions 5 are turned into vertical positions, the wires 34 being tightened to retain the extensions in place. By means of a crank engaging with the pinion 26, said pinion and shaft 28 may be rotated thereby carrying the uppermost goods holding member upwardly. As this occurs the dog 29 slips by the teeth of the pinion 26 permitting the elevation of the goods holding members but normally engaging between the teeth to prevent the lowering thereof. The uppermost goods holding member may be carried to its highest position, the members below by reason of the connections between them and the upper member being also elevated partially, and positioned in spaced apart relation along the length of the standards 4 and their extensions 5, and as heretofore pointed out, the articles carried thereby are automatically placed in display position with the extension of the rack. When in such position any of the articles may be conveniently examined or removed. When it is desired to again collapse the rack, the crank for turning the pinion 26 is again inserted into the opening 27 and the dog 29 is disengaged by means of the handle 31, permitting the back rotation of the crank to lower the goods holding members and turn the articles on their sides until the rack assumes the position shown in Fig. 3. The guy wires 34 are then loosened by operating devices 35 and the extensions 5 collapsed whereupon the entire construction may be then inclosed by the top 2 of the trunk.

From the foregoing, it will be evident that

I have provided a novel means for extending and collapsing the rack and one that is very practical and useful. Various modifications in structure may be resorted to, to effect the same operation and without departing from my invention. The disclosure made, while of a practical and operative embodiment of my invention, is nevertheless to be taken as merely diagrammatic and illustrative thereof and not in any sense as limiting the invention to any precise structure other than is called for by the terms of the pending claims.

I claim:

1. A display rack including a base, standards secured in spaced apart relation on the base, a pivotally connected extension to each standard, racks formed on the standards and extensions, guy wires connected to the upper end of each extension and to the base, means for adjusting the length of the guy wires, goods holding members slidably mounted one above another on the standards and lying between the standards, flexible connections between adjacent goods holding members, a casing at each end of the upper most goods holding member, the standards passing vertically through the casings, a sleeve having a portion at its lower end removed, positioned within each casing and receiving the standards, a shaft lying between and extending through the inner sides of the casings, pinions one at each end of the shaft located in the casings and meshing with the said racks, means normally engaging one of the pinions to prevent rotation thereof in one direction but permitting rotation in the opposite direction, and means for manually operating said engaging means to disengage it from the pinion.

2. A display rack including a base, standards connected at the ends of the base, a pivotally connected extension to each standard, racks formed on the standards and extensions, means to hold the extensions in vertical position, means to render the holding means inoperative permitting the folding of the extensions toward each other, goods holding members lying between the standards and mounted for slidable movement thereon, one above another, flexible connections between adjacent goods holding members, a casing at each end of the uppermost goods holding member, the standards passing vertically through the casings, a shaft lying between and extending through the inner sides of the casings, pinions one at each end of the shaft located in the casings and engaging with the racks, and means to control the rotary movement of one of the pinions to hold it against reverse movement when turned in one direction of its movement.

3. A display rack including spaced apart standards, a pivotally connected extension to each standard, said standards and extensions being formed with racks on one side thereof and said extensions being adapted to turn toward each other between the standards, goods holding members slidably mounted on and between the standards, said members being positioned one above the other and adapted to rest one on the other, connections between the goods holding members, casings forming a part of the upper goods holding member and sliding on the standards, pinions in the casings, racks formed on the standards with which said pinions mesh, means whereby the said pinions may be simultaneously rotated to thereby elevate the upper goods holding member, and means to secure the extensions in upright position, substantially as described.

4. A display rack including spaced apart standards, goods holding members slidably mounted on and between the standards, said members being positioned one above the other and adapted to rest one on the other, connections between the goods holding members, casings forming a part of the upper goods holding member, sleeves within the casings having a portion at their lower ends removed loosely receiving the standards, a rack formed on each standard, a pinion in each casing, a shaft connecting the pinions and means whereby a pinion may be rotated, thereby simultaneously elevating both ends of the upper goods holding member along the standards.

5. A display rack including spaced apart standards, goods holding members slidably mounted on and between the standards, one above the other and adapted to rest one on the other, connections between the said members causing the members to be positioned in spaced apart relation as the upper member is elevated along the standards, casings forming a part of the upper member sliding on the standards, a rack formed on each standard, a pinion in each casing engaging with the rack, a shaft connecting the pinions, a dog engaging with each pinion and a handle connected to each dog and projecting through the wall of its associated casing.

In testimony whereof I affix my signature in presence of two witnesses.

THOMAS G. CUMMINGS.

Witnesses:
FRANK E. LIVERANCE, Jr.
HOWARD H. YARRINGTON.

Copies of this patent may be obtained for five cents each, by addressing the "Commissioner of Patents, Washington, D. C."